(12) United States Patent
Jain et al.

(10) Patent No.: US 11,758,428 B2
(45) Date of Patent: Sep. 12, 2023

(54) TECHNIQUES FOR PROVIDING TRAFFIC FLOW TEMPLATE (TFT) INFORMATION IN WIRELESS COMMUNICATIONS

(71) Applicant: Microsoft Technology Licensing, LLC, Redmond, WA (US)

(72) Inventors: Piyush Jain, Karnataka (IN); Sreenivas Reddy Komati Reddy, Acton, MA (US); Dhananjaya Shirsat, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/345,999

(22) Filed: Jun. 11, 2021

(65) Prior Publication Data

US 2022/0361035 A1    Nov. 10, 2022

(30) Foreign Application Priority Data

May 7, 2021    (IN) .............................. 202141020885

(51) Int. Cl.
*H04W 28/02* (2009.01)
*H04W 28/24* (2009.01)
*H04L 65/1066* (2022.01)

(52) U.S. Cl.
CPC ..... *H04W 28/0263* (2013.01); *H04L 65/1066* (2013.01); *H04W 28/0268* (2013.01); *H04W 28/24* (2013.01)

(58) Field of Classification Search
CPC ......... H04W 28/0263; H04W 28/0268; H04W 28/24; H04W 36/26; H04W 8/00; H04W 88/14; H04W 76/12; H04W 76/22; H04L 65/1066; H04L 65/1086
See application file for complete search history.

(56) References Cited

U.S. PATENT DOCUMENTS

| | | | |
|---|---|---|---|
| 2008/0019275 A1* | 1/2008 | Mudireddy | H04L 47/10 370/235 |
| 2015/0215971 A1* | 7/2015 | Korhonen | H04W 76/12 370/329 |
| 2019/0141564 A1* | 5/2019 | Parikh | H04W 76/22 |
| 2019/0313310 A1* | 10/2019 | Won | H04W 36/14 |
| 2020/0322834 A1 | 10/2020 | Huang-Fu et al. | |
| 2020/0329397 A1 | 10/2020 | Huang-Fu | |

OTHER PUBLICATIONS

Huawei, et al., "Handling of Mapped EPS Bearer Contexts", In Proceedings of 3GPP TSG Electronic Meeting, vol. CT WG1, Apr. 16, 2020, 18 Pages.
"International Search Report and Written Opinion Issued in PCT Application No. PCT/US22/024154", dated Aug. 4, 2022, 12 Pages.

* cited by examiner

*Primary Examiner* — Omer S Mian
(74) *Attorney, Agent, or Firm* — ArentFox Schiff LLP

(57) ABSTRACT

Described are examples for receiving, by a network node, a request message from a user equipment (UE) to establish or modify a protocol data unit (PDU) session for the UE, and transmitting, by the network node, to the UE, and based on the request, a command message to establish or modify the PDU session for the UE, wherein the command message includes multiple traffic flow template (TFT) information elements per bearer.

18 Claims, 4 Drawing Sheets

TECHNIQUES FOR PROVIDING TRAFFIC FLOW TEMPLATE (TFT) INFORMATION IN WIRELESS COMMUNICATIONS

CLAIM OF PRIORITY UNDER 35 U.S.C. § 119

The present application for patent claims priority to Indian Patent Application No. 202141020885, entitled "TECHNIQUES FOR PROVIDING TRAFFIC FLOW TEMPLATE (TFT) INFORMATION IN WIRELESS COMMUNICATIONS" filed May 7, 2021, which is assigned to the assignee hereof and hereby expressly incorporated by reference herein for all purposes.

BACKGROUND

Wireless communication systems are provided to facilitate network access to various devices, including user equipment (UEs). A wireless communication system can operate according to a wireless telecommunication standard, such a fifth generation (5G) new radio (NR), and can include a radio access network (RAN) to facilitate radio communications between devices and the network and a backend network including various nodes to manage device access. The various nodes can manage device access via the RAN portion of the wireless communication system that communicates with the device. The backend network nodes can include physical machines or corresponding functions managed over one or more physical machines. Examples of the backend network nodes can include a session management function (SMF), access and mobility management function (AMF), user plane function (UPF), policy control function (PCF), etc. In an example, the UPF can manage traffic flow templates (TFT) used to route network traffic to a device over one or more bearers, such as an evolved packet system (EPS) bearer, where each bearer can provide a quality-of-service (QoS) or other distinct service parameters for communications between the device and network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a method for wireless communication is provided that includes determining to establish or modify a protocol data unit (PDU) session for a user equipment (UE), generating a command message that includes a mapped evolved packet system (EPS) bearer context indicating an EPS bearer on which one or more traffic flow template (TFT) operations are performed to establish or modify the PDU session for the UE, wherein the mapped EPS bearer context includes multiple TFT information elements representing the one or more TFT operations, and transmitting, by the network node, to the UE, and based on determining to modify or establish the PDU session, the command message.

In another example, a device for wireless communications is provided that includes a memory storing one or more parameters or instructions for communicating with one or more UEs via a radio access network node, and at least one processor coupled to the memory. The at least one processor is configured to determine to establish or modify a PDU session for a UE, generate a command message that includes a mapped EPS bearer context indicating an EPS bearer on which one or more TFT operations are performed to establish or modify the PDU session for the UE, wherein the mapped EPS bearer context includes multiple TFT information elements representing the one or more TFT operations, and transmit, to the UE and based on determining to modify or establish the PDU session, the command message.

In another example, a computer-readable medium is provided including code executable by one or more processors for wireless communication. The code includes code for determining to establish or PDU session for a UE, generating a command message that includes a mapped EPS bearer context indicating an EPS bearer on which one or more TFT operations are performed to establish or modify the PDU session for the UE, wherein the mapped EPS bearer context includes multiple TFT information elements representing the one or more TFT operations, and transmitting, by the network node, to the UE, and based on determining to modify or establish the PDU session, the command message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
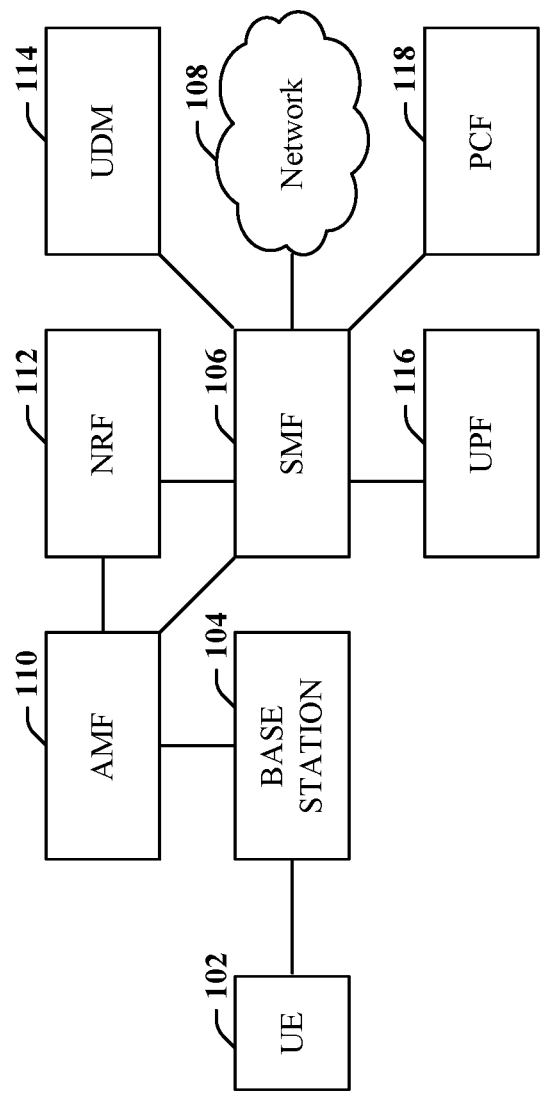
FIG. 1 is a diagram of an example of a wireless network, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to communicating traffic flow template (TFT) information between nodes of a wireless network. In wireless communication technologies such as fifth generation (5G) new radio (NR), a node of a wireless network can include a node of a backend network, such as a session management function (SMF), which can manage communications between a device, such as a user equipment (UE), and the wireless network via a base station or other radio access network (RAN) node. The SMF can communicate with a user plane function (UPF) that manages traffic flows (e.g., TFTs) for the UE to route network traffic to the UE over corresponding bearers. The SMF can also communicate with a policy control function (PCF) that can manage establishing TFTs for a UE. The UE can request bearer or TFT modification with the SMF, and the SMF can manage corresponding modification of a context of the bearer, or the TFT, etc. in the wireless network. Currently, the SMF can transmit messages to the UE to indicate bearer or TFT modification, and these messages can include a single TFT information element per bearer. In this example, the SMF transmits one message per TFT operation. In addition, the single TFT information element has an associated maximum size within which the TFT information can be conveyed.

Aspects described herein relate to transmitting a message to the UE for modifying or establishing bearers or TFTs, where a single message can include multiple TFT information elements, such that the SMF can transmit one message for multiple TFT operations. This can reduce signaling overhead for transmitting multiple TFT information elements corresponding to multiple TFT operations. In addition, this can allow for sending a single message indicating multiple TFT information elements where a single TFT information element may exceed a maximum size for a given one or more TFT operation. In one example, the aspects can be applied to interworking-enabled 5G sessions, such as sessions where communications using 4G and 5G networks are supported for a given device. In this and other examples, the network can enable sending of multiple EPS bearer TFT parameters or information elements in mapped EPS bearer context information elements in 5G non-access stratum (NAS) messages. In an example, the network can enable sending of the multiple EPS bearer TFT information elements in a single mapped EPS bearer content when multiple TFT operations are triggered from a PCF initiated modify or PCF update message, as described herein.

Figure 2:
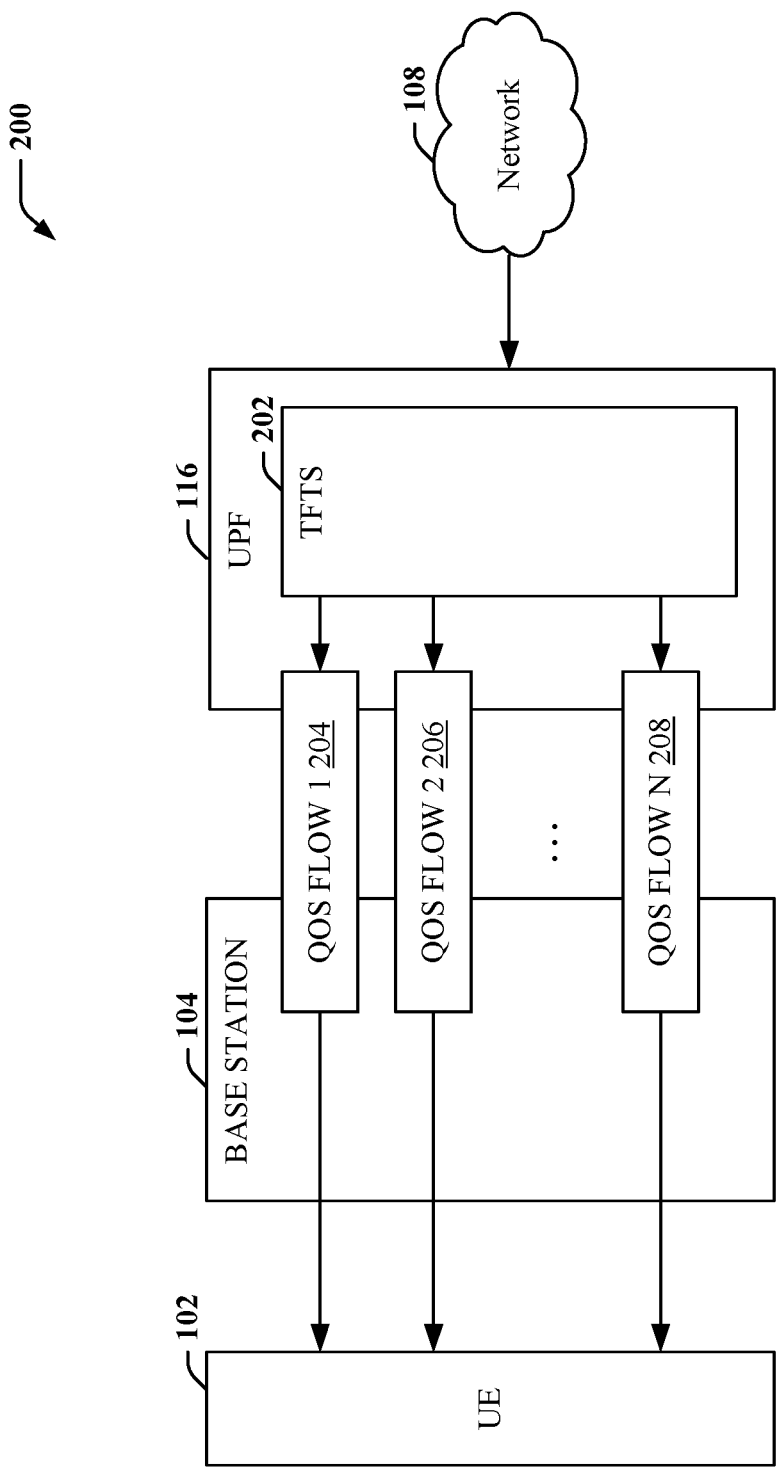
FIG. 2 is a conceptual diagram of an example of a wireless network with traffic flow templates (TFTs) for a user equipment (UE), in accordance with aspects described herein.
Figure 3:
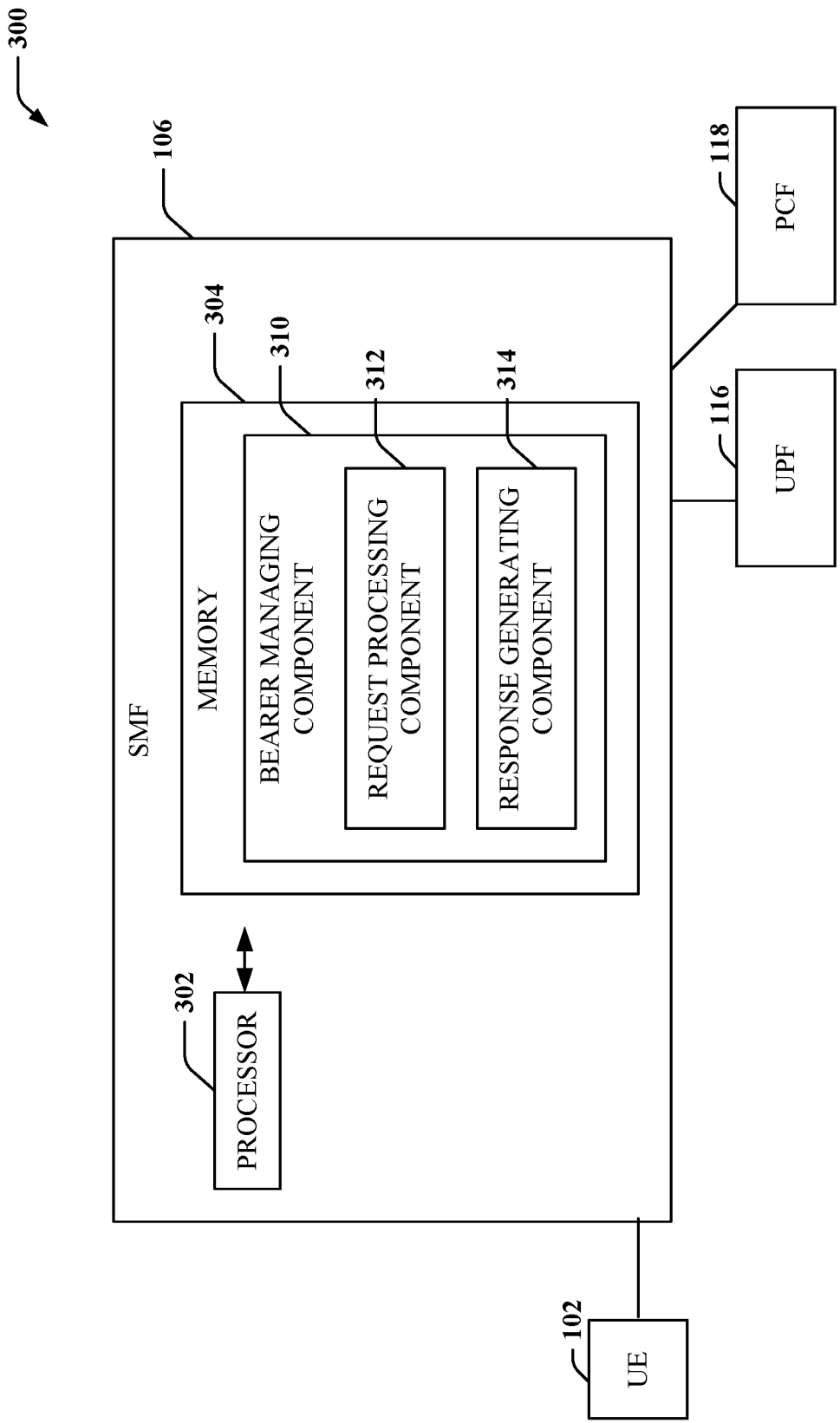
FIG. 3 is a schematic diagram of an example of a device for managing bearers or bearer contexts for a UE, in accordance with aspects described herein.

Turning now to FIGS. 1-4, examples are depicted with reference to one or more components and one or more methods that may perform the actions or operations described herein, where components and/or actions/operations in dashed line may be optional. Although the operations described below in FIG. 3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example of a wireless network 100. For example, wireless network 100 may be a 5G NR network, which can include a UE 102, a base station 104, which can be a Next Generation NodeB (gNB), session management function (SMF) 106, network 108, which can be a network such as an Internet or access thereto, access and mobility management function (AMF) 110, network function (NF) repository function (NRF) 112, unified data management (UDM) 114, user plane function (UPF) 116, policy control function (PCF) 118. The AMF 110 can be a control node that processes the signaling between the UE 102 and the other nodes of the wireless network 100. Generally, the AMF 110 can provide quality-of-service (QoS) flow and session management. User Internet protocol (IP) packets (e.g., from one or more UEs 102) can be transferred through the UPF 116. The UPF 116 can provide UE IP address allocation for one or more UEs, as well as other functions. The UPF 116 can be connected to the network 108 to receive IP services, such as services or packets via an Internet, an intranet, an IP Multimedia Subsystem IMS, a PS Streaming Service, and/or other IP services.

In one example, the SMF 106 can be provided by or can otherwise include a gateway function, such as a packet data network (PDN) gateway (PGW), or at least a PGW-control (PGW-C) function. In this example, SMF 106 can send NAS messages to the UE 102 via base station 104 in providing an evolved packet system (EPS) session, or similar bearer based session, for the UE 102. In this example, the base station 104, providing at least a portion of the RAN portion of the wireless network, can communicate access stratum (AS) messages with the UE 102 corresponding to communications over the EPS bearer of the UE 102. In accordance with aspects described herein, SMF 106 can manage communications between the UE 102 and other nodes of the wireless network (e.g., other nodes of the backend network portion of the wireless network, such as AMF 110, UPF 116, etc.). In one specific example, SMF 106 can receive and respond to protocol data unit (PDU) session establishment or modification requests from the UE 102. In aspects described herein, the response messages can include multiple TFT information elements to reduce signaling for indicating multiple TFT operations, allow for splitting TFT information that may exceed a maximum information element size into multiple TFT information elements, etc.

FIG. 2 is a conceptual diagram of an example of a wireless network 200 for managing TFTs 202 for a UE 102. Wireless network 200 includes a base station 104 and/or one or more other components of wireless network 100 described above to facilitate communications between UE 102 and UPF 116 and/or network 108 to allow the UE 102 to receive communications and/or services (e.g., IP services) from network 108. In wireless network 200, UPF 116 can manage one or more TFTs 202 for the UE 102 to route traffic from network 108 to the UE 102 and/or vice versa. For example, the TFTs 202 can be associated with a service received via the network 108 and one or more QoS flows for the UE 102, such as QoS flow 1 204, QoS flow 2 206, . . . QoS flow N 208, etc. The TFT 202 can include routing information, such as an identification of a service or related address from which the service is received and an identification of a corresponding QoS flow, such that UPF 116 can route packets received from network 108 onto the one or more QoS flows for providing to the UE 102.

In an example, each of QoS flow 1 204, QoS flow 2 206, . . . QoS flow N 208, etc. can be associated with a single EPS bearer (e.g., a dedicated EPS bearer for the UE 102) and/or can be associated with a given radio bearer between the base station 104 and UE 102 that can provide the corresponding QoS. The UE 102 can request bearer establishment or modification, which can result in addition, removal, or modification of the TFTs 202 and/or associated packet filters. An SMF, for example, can receive and handle the request, as described above and further herein, which can cause modification to TFTs 202 of the UPF 116, such to add, remove, or modify one or more TFTs 202 corresponding to a service received via network 108.

FIG. 3 is a schematic diagram of an example of a wireless network 300 including an SMF 106. In an example, SMF 300 can include a processor 302 and/or memory 304 configured to execute or store instructions or other parameters related to performing one or more functions described herein. For example, processor 302 and/or memory 304 can be configured to execute or store instructions or other parameters related to providing a bearer managing component 310 for managing one or more aspects of establishing or modifying bearers or associated TFTs for the UE 102, as described further herein. For example, processor 302 and memory 304 may be separate components communicatively coupled by a bus (e.g., on a motherboard or other portion of a computing device, on an integrated circuit, such as a system on a chip (SoC), etc.), components integrated within one another (e.g., processor 302 can include the memory 304 as an on-board component), and/or the like. Memory 304 may store instructions, parameters, data structures, etc. for use/execution by processor 302 to perform functions described herein.

In an example, as described, UE 102 can communicate with the SMF 106 via one or more base stations 104 to access the wireless network. SMF 106 can manage EPS bearers for the UE 102, and as such SMF 106 can communicate with the PCF 118 to modify TFTs associated with the bearers, where the UPF 116 can use the bearers for routing packets to the UE 102, as described. SMF 106 can include the PGW-C function as described. In some examples, SMF 106 may be or include an AMF 110 as well or other nodes to facilitate managing bearers or bearer contexts for the UE 102. SMF 106 can include a bearer managing component 310 for managing the bearers for the UE 102, which may include storing information related to the bearers, such as a bearer context, identifier, etc., communicating with one or more nodes to effectuate modifications of the bearer, which can include adding, deleting, or modifying TFTs or associated packet filters, etc. Bearer managing component 310 can include a request processing component 312 for receiving and/or processing a request received from the UE 102 to establish or modify one or more bearers or properties associated therewith (e.g., TFTs, packet filters, etc.), and/or a response generating component 314 for generating a response to a request from the UE 102, which can be generated once the bearer is established or modified, as requested by the UE 102.

In an aspect described herein, response generating component 314 can receive (e.g., from PCF 118) an indication of one or more TFT operations performed for one or more bearers for which to notify the UE 102. Response generating component 314 can accordingly generate one or more TFT information elements for reporting to the UE 102. In an example, response generating component 314 can generate multiple TFT information elements for reporting to the UE 102 in a single NAS message. In one example, response generating component 314 can generate multiple TFT information elements each corresponding to one of multiple TFT operations to report to the UE 102. In another example, response generating component 314 can generate multiple TFT information elements based on determining that a single TFT information element to report one or more TFT operations would exceed a maximum TFT information element size.

Figure 4:
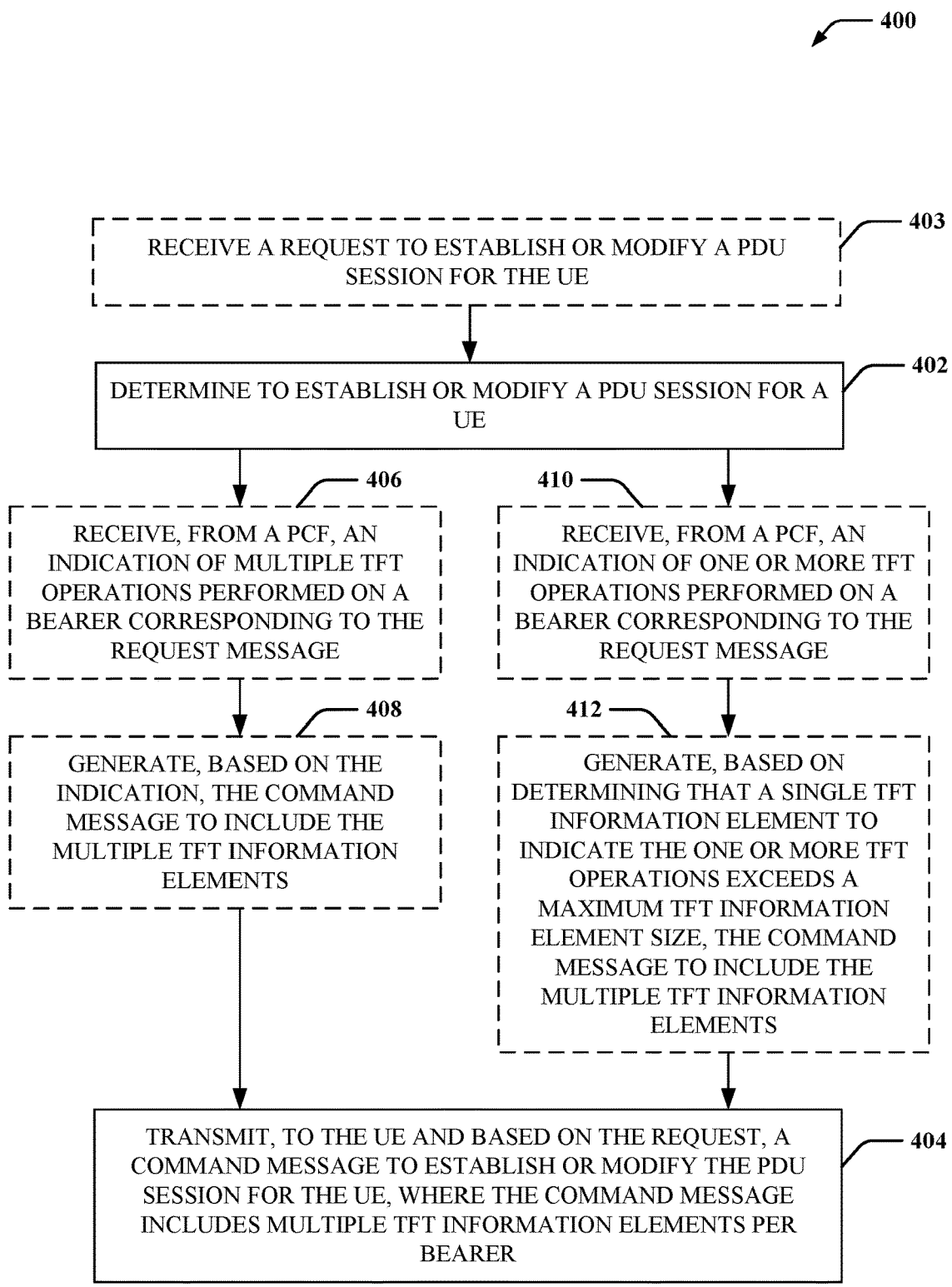
FIG. 4 is a flow diagram of an example of a method for transmitting multiple TFT information elements in a message to a UE, in accordance with aspects described herein.

FIG. 4 is a flowchart of an example of a method 400 for sending a message with multiple TFT information elements per bearer or bearer context. For example, method 400 can be performed by a SMF 106 or other network node or function, and/or one or more components thereof, as described in any of FIGS. 1-3 above.

In method 400, at action 402, it can be determined to establish or modify a PDU session for a UE. In an example, request processing component 312, e.g., in conjunction with processor 302, memory 304, bearer managing component 310, etc., can determine to establish or modify the PDU session for the UE (e.g., UE 102). In one example, method 400 can optionally include, at action 403, receiving a request to establish or modify a PDU session for the UE. In an example, request processing component 312, e.g., in conjunction with processor 302, memory 304, bearer managing component 310, etc., can receive the request to establish or modify the PDU session for the UE. In an example, request processing component 312 can determine to establish or modify the PDU session for the UE based on the request or based on other information or parameters received from the UE 102 or from one or more other backend network components for the UE 102 or otherwise.

For example, the UE 102 can transmit a request message as a NAS message using RAN signaling with a base station 104, and the base station 104 can forward the request message to the SMF 106 or other node of the wireless network. For example, the request message may include a PDU session establishment request or PDU session modification request, as defined in 5G NR, such as in third generation partnership project (3GPP) technical specification (TS) 24.501, sections 8.3.1 and 8.3.7, respectively. In an example, request processing component 312 can receive the request and can process the request by communicating with other nodes of the wireless network, as described. For example, SMF 106 can communicate with a PCF 118 to modify one or more TFTs or associated packets filters for the UE bearer context. PCF 118 can modify the one or more TFTs, which can be managed by the UPF 116, as described, and PCF 118 can send an indication of TFT operations performed to the SMF 106.

In other examples, the network, such as network 108 or other nodes of the backend network portion of the wireless communication system, can initiate a command to establish or modify the PDU session for the UE 102, and request processing component 312 can accordingly receive and process the request from the network. In this example, request processing component 312 can determine to establish or modify the PDU session for the UE based on a PDU session modification command message received from, or otherwise originated within, the wireless network (e.g., from another node of the wireless network, etc.).

In method 400, at action 404, a command message to establish or modify the PDU session for the UE can be transmitted to the UE and based on the request, where the command message includes multiple TFT information elements per bearer. In an example, response generating component 314, e.g., in conjunction with processor 302, memory 304, bearer managing component 310, etc., can generate and/or transmit, to the UE and based on the request, the command message to establish or modify the PDU session for the UE, where the command message includes multiple TFT information elements per bearer. For example, the TFT information elements can each relate to one or more TFT operations performed for the UE 102 by one or more nodes of the backend portion of the wireless communication system, which may include adding, removing, modifying, etc. packet filters or other TFT parameters. In an example, the command message can include a PDU session establishment accept or PDU session modification command, as defined in 5G NR, such as in 3GPP TS 24.501, sections 8.3.2 and 8.3.9, respectively.

In an example, the command message can include mapped EPS bearer contexts. For example, the mapped EPS bearer context can correspond to a mapping between a EPS bearer in the network and one or more QoS flows of the UE. The mapped EPS bearer context can indicate one or more modifications to the EPS bearer for the UE 102, such as TFT or packet filter addition, removal, or modification, etc. The one or more TFT operations can be indicated in multiple TFT information elements in a single mapped EPS bearer context, in one example (e.g., as different EPS parameters in the EPS parameter list of the EPS bearer context). For example, each mapped EPS bearer context in the command message can include a list of one or more EPS parameters, where the list can include, for each EPS parameter, an EPS parameter identifier and the EPS parameter contents. The EPS parameter identifier can identify the EPS parameter as one of mapped EPS QoS parameters, mapped extended EPS QoS parameters, TFT, access point name (APN)-aggregate maximum bit rate (AMBR), or extended APN-AMBR, as specified in 3GPP TS 24.501, section 9.11.4.8. Thus, for example, a given EPS bearer context can include multiple EPS parameters, where the multiple EPS parameters can include multiple TFT information elements.

In an example, each TFT information element can have an opcode indicating whether the TFT information element is for addition, modification, or removal of a TFT or corresponding packet filter(s). For example, the opcode can indicate one of create a new TFT, delete an existing TFT, add packet filters to an existing TFT, replace packet filters in an existing TFT, delete packet filters from an existing TFT, or perform no TFT operation. In one example, at least two of the multiple TFT information elements in the command message may have a different associated TFT opcode. The TFT information elements can be send during 5G QoS flow creation, modification, or release procedure, as described, which can be part of a mapped EPS bearer context sent for interworking-enabled 5G sessions.

Specifically, 3GPP TS 24.501, section 9.11.4.8 indicates that the EPS parameter identifier field is used to identify each EPS parameter included in the EPS parameters list and it contains the hexadecimal coding of the EPS parameter identifier. This section also indicates that Bit 8 of the EPS parameter identifier field contains the most significant bit and bit 1 contains the least significant bit. In this version of the protocol, the following EPS parameter identifiers are specified–01H (Mapped EPS QoS parameters), 02H (Mapped extended EPS QoS parameters), –03H (Traffic flow template), –04H (APN-AMBR), 05H (extended APN-AMBR). If the EPS parameters list contains an EPS parameter identifier that is not supported by the receiving entity the corresponding EPS parameter may be discarded. In aspects described herein, multiple TFT information elements (03H Traffic Flow Template) can be sent per bearer, such as inside a given mapped EPS bearer context as multiple EPS parameters.

In any case, for example, the command message can inform the UE of the one or more TFT operations indicated in the multiple TFT information elements. This may enable the UE to modify one or more QoS flows or other parameters at the UE based on the TFT operations indicated by the multiple TFT information elements.

In method 400, optionally at action 406, an indication of multiple TFT operations performed on a bearer corresponding to the request message can be received from a PCF. In an example, bearer managing component 310, e.g., in conjunction with processor 302, memory 304, etc., can receive, from the PCF (e.g., PCF 118), the indication of multiple TFT operations performed on the bearer corresponding to the request message. As described, bearer managing component 310 can send bearer establishment or modification information to the PCF 118 based on the request received from the UE 102 to cause addition, modification, or removal of one or more EPS bearers or bearer contexts (e.g., addition, modification, or removal of TFTs or packet filters associated with the bearer context). In this regard, bearer managing component 310 can receive the indication of multiple TFT operations from the PCF 118. For example, the multiple TFT operations can include adding multiple TFTs or packet filters for a IP service received via network 108. In other examples, the multiple TFT operations can include substantially any combination of adding, modifying, or removing multiple TFTs or packet filters for one or more IP services received via network 108.

In method 400, optionally at action 408, the command message can be generated, based on the indication, to include the multiple TFT information elements. In an example, response generating component 314, e.g., in conjunction with processor 302, memory 304, bearer managing component 310, etc., can generate, based on the indication, the command message to include the multiple TFT information elements. For example, the multiple TFT information elements can include one TFT information element per TFT operation performed for the EPS bearer of the UE 102. Thus, a smaller number of command messages can be sent to notify of multiple TFT operations, which can reduce signaling overhead associated with transmitting the command message. For example, response generating component 314 can generate the command message to include a mapped EPS bearer context indicating the EPS bearer on which the multiple TFT operations are performed in establishing or modifying the PDU session for the UE. In this regard, for example, the mapped EPS bearer context in the command message can include multiple TFT information elements representing the multiple TFT operations.

In another example in method 400, optionally at action 410, an indication of one or more TFT operations performed on a bearer corresponding to the request message can be received from a PCF. In an example, bearer managing component 310, e.g., in conjunction with processor 302, memory 304, etc., can receive, from the PCF (e.g., PCF 118), the indication of one or more TFT operations performed on the bearer corresponding to the request message. As described, bearer managing component 310 can send bearer establishment or modification information to the PCF 118 based on the request received from the UE 102 to cause addition, modification, or removal of one or more EPS bearers or bearer contexts (e.g., addition, modification, or removal of TFTs or packet filters associated with the bearer context). In this regard, bearer managing component 310 can receive the indication of one or more TFT operations from the PCF 118. For example, the one or more TFT operations can include adding multiple TFTs or packet filters for a IP service received via network 108. In other examples, the one or more TFT operations can include substantially any combination of adding, modifying, or removing multiple TFTs or packet filters for one or more IP services received via network 108. For example, response generating component 314 can generate the command message to include a mapped EPS bearer context indicating the EPS bearer on which the one or more TFT operations are performed in establishing or modifying the PDU session for the UE. In this regard, for example, the mapped EPS bearer context in the command message can include multiple TFT information elements representing the one or more TFT operations Due to the nature of the TFT operation, however (e.g., if multiple packet filters are added, removed, and/or modified in a given TFT operation), a single TFT operation (or multiple TFT operations) may cause generation of a TFT information element that exceeds a maximum TFT information element size. For example, the maximum TFT information element size may be 255 bits. Where this maximum TFT information element size would be exceeded by a single TFT information element, response generating component 314 can generate the command message to include multiple TFT information elements to reduce a given TFT information element to be at or below the maximum size.

In method 400, optionally at action 412, based on determining that a single TFT information element to indicate the one or more TFT operations exceeds a maximum TFT information element size, the command message can be generated to include the multiple TFT information elements. In an example, response generating component 314, e.g., in conjunction with processor 302, memory 304, bearer managing component 310, etc., can generate, based on determining that the single TFT information element to indicate the one or more TFT operations exceeds the maximum TFT information element size, the command message to include the multiple TFT information elements. For example, response generating component 314 can determine how many TFT operations to move from the TFT information element that exceeds the maximum TFT information element size to one or more additional TFT information elements so that no TFT information element in the command message exceeds the maximum TFT information element size.

In one example, response generating component 314 can determine which TFT operations to keep in a first TFT information element to comply with the maximum TFT information element size, and can move the remaining TFT operations to one or more other TFT information elements. In another example, response generating component 314 can evenly split the TFT operations into multiple TFT information elements until all TFT information elements comply with the maximum TFT information element size.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A device for wireless communications, comprising:
a memory storing one or more parameters or instructions for communicating with one or more user equipment (UEs) via a radio access network node; and
at least one processor coupled to the memory, wherein the at least one processor is configured to:
determine to establish or modify a protocol data unit (PDU) session for a UE;
generate a command message that includes a mapped evolved packet system (EPS) bearer context indicating an EPS bearer on which a traffic flow template (TFT) operation is performed to establish or modify the PDU session for the UE, wherein the device includes, in the mapped EPS bearer context, multiple TFT information elements to represent the TFT operation where a size of information to represent the TFT operation exceeds a maximum size for one TFT information element, and wherein the information to represent the TFT operation is split into the multiple TFT information elements; and
transmit, to the UE and based on determining to modify or establish the PDU session, the command message.

2. The device of claim 1, wherein at least one of the multiple TFT information elements includes a TFT opcode indicating to at least one of create a new TFT, delete an existing TFT, add packet filters to an existing TFT, replace packet filters in an existing TFT, delete packet filters from an existing TFT, or perform no TFT operation.

3. The device of claim 1, wherein the at least one processor is further configured to receive, from a policy control function (PCF), an indication of the TFT operation performed on the EPS bearer corresponding to the command message, wherein the at least one processor is configured to generate the command message based on receiving the indication of the TFT operation.

4. The device of claim 1, wherein the at least one processor is further configured to receive, from a policy control function (PCF), an indication of the TFT operation performed on the EPS bearer corresponding to the command message, wherein the at least one processor is configured to generate the command message based on receiving the indication of the TFT operation.

5. The device of claim 4, wherein the at least one processor is configured to generate the command message at least in part by generating each of the multiple TFT information elements to indicate a portion of the TFT operation.

6. The device of claim 1, wherein the at least one processor is configured to determine to establish or modify the PDU session based on a request received from the UE.

7. The device of claim 1, wherein the mapped EPS bearer context corresponds to a mapping between the EPS bearer and one or more quality-of-service (QoS) flows of the UE, and wherein the TFT operation corresponds to at least one of the one or more QoS flows.

8. The device of claim 7, wherein the command message enables the UE to modify the one or more QoS flows based on the TFT operation indicated in the multiple TFT information elements.

9. A method for wireless communications, comprising:
determining, by a device, to establish or modify a protocol data unit (PDU) session for a user equipment (UE);
generating a command message that includes a mapped evolved packet system (EPS) bearer context indicating an EPS bearer on which a traffic flow template (TFT) operation is performed to establish or modify the PDU session for the UE, wherein the device includes, in the mapped EPS bearer context, multiple TFT information elements to represent the TFT operation where a size of information to represent the TFT operation exceeds a maximum size for one TFT information element, and wherein the information to represent the TFT operation is split into the multiple TFT information elements; and
transmitting, to the UE, and based on determining to modify or establish the PDU session, the command message.

10. The method of claim 9, wherein at least one of the multiple TFT information elements includes a TFT opcode indicating to at least one of create a new TFT, delete an existing TFT, add packet filters to an existing TFT, replace packet filters in an existing TFT, delete packet filters from an existing TFT, or perform no TFT operation.

11. The method of claim 9, further comprising receiving, from a policy control function (PCF), an indication of the TFT operation performed on the EPS bearer corresponding to the command message, wherein generating the command message is based on receiving the indication of the TFT operation.

12. The method of claim 9, further comprising receiving, from a policy control function (PCF), an indication of the TFT operation performed on the EPS bearer corresponding to the command message, wherein generating the command message is based on receiving the indication of the TFT operation.

13. The method of claim 12, wherein generating the command message includes generating each of the multiple TFT information elements to indicate a portion of the TFT operation.

14. The method of claim 9, wherein determining to establish or modify the PDU session is based on a request received from the UE.

15. The method of claim 9, wherein the mapped EPS bearer context corresponds to a mapping between the EPS bearer and one or more quality-of-service (QoS) flows of the UE, and wherein the TFT operation correspond to at least one of the one or more QoS flows.

16. The method of claim 15, wherein the command message enables the UE to modify the one or more QoS flows based on the TFT operation indicated in the multiple TFT information elements.

17. A non-transitory computer-readable medium, comprising code executable by one or more processors for wireless communication, the code comprising code for:
determining to establish or modify a protocol data unit (PDU) session for a user equipment (UE);
generating a command message that includes a mapped evolved packet system (EPS) bearer context indicating an EPS bearer on which a traffic flow template (TFT) operation is performed to establish or modify the PDU session for the UE, wherein, the UE includes, in the mapped EPS bearer context, multiple TFT information elements to represent the TFT operation where a size of information to represent the TFT operation exceeds a maximum size for one TFT information element, and wherein the information to represent the TFT operation is split into the multiple TFT information elements; and
transmitting, to the UE, and based on determining to modify or establish the PDU session, the command message.

18. The non-transitory computer-readable medium of claim 17, wherein at least one of the multiple TFT information elements includes a TFT opcode indicating to at least one of create a new TFT, delete an existing TFT, add packet filters to an existing TFT, replace packet filters in an existing TFT, delete packet filters from an existing TFT, or perform no TFT operation.

* * * * *